(12) United States Patent
Borrell

(10) Patent No.: US 11,819,045 B2
(45) Date of Patent: Nov. 21, 2023

(54) INTEGRATED MACHINE FOR PROCESSING NUTS WITH HARD OR SOFT SHELLS

(71) Applicant: Jose Borrell S.A., Denia (ES)

(72) Inventor: Jose Vicente Roig Borrell, Denia (ES)

(73) Assignee: Jose Borrell S.A.

( * ) Notice: Subject to any disclaimer, the term of this patent is extended or adjusted under 35 U.S.C. 154(b) by 356 days.

(21) Appl. No.: 16/951,711

(22) Filed: Nov. 18, 2020

(65) Prior Publication Data

US 2021/0145039 A1   May 20, 2021

(30) Foreign Application Priority Data

Nov. 18, 2019   (ES) .................................. 201931003

(51) Int. Cl.
*A23N 5/00* (2006.01)
*B07B 1/28* (2006.01)

(52) U.S. Cl.
CPC ................ *A23N 5/008* (2013.01); *B07B 1/28* (2013.01)

(58) Field of Classification Search
CPC .................................. A23N 5/008; B07B 1/28
USPC ......................................................... 426/479
See application file for complete search history.

(56) References Cited

U.S. PATENT DOCUMENTS

| | | | | |
|---|---|---|---|---|
| 3,165,134 A | * | 1/1965 | Wayne | ...................... B02B 3/00 99/605 |
| 2009/0301320 A1 | * | 12/2009 | Borrell | .................. A23N 5/008 99/569 |

* cited by examiner

*Primary Examiner* — Brent T O'Hern
(74) *Attorney, Agent, or Firm* — ST. ONGE STEWARD JOHNSTON AND REENS

(57) ABSTRACT

An integrated machine for processing nuts with hard or soft shells, having a feeding hopper and a processing mechanism suitable for peeling or dehulling the fruit, including screener arranged below the processing mechanism, the screener comprising at least one screen element to separate the product into two levels, where the processing mechanism includes an outlet for the mixture obtained after processing the fruit and arranged in correspondence with a projection of a first inlet end of the screener, and a selector to make a selection by suction applied to at least one level of the screening means.

11 Claims, 5 Drawing Sheets

INTEGRATED MACHINE FOR PROCESSING NUTS WITH HARD OR SOFT SHELLS

FIELD OF THE INVENTION

The present invention pertains to the technical field of the machines for processing nuts, comprising a feeding hopper and a processing mechanism suitable for peeling or dehulling the nuts, specifically a mechanism for the peeling or dehulling/splitting thereof.

BACKGROUND OF THE INVENTION

At present, the machines that perform the functions of peeling or dehulling the nuts perform only that function which results in product a mixture of skins and almonds with shell in the case of the peeling, and shells and fruit in the case of the dehulling.

In any type of fruit and particularly in the case of almonds, these actions have traditionally been carried out without further complications, however due to the introduction of new varieties of almonds that are softer in nature, their behavior is different, so that the result obtained with these machines is no longer the same or as effective as it initially was.

In this way, when these new varieties of almonds are processed, the reality is that in a peeling process not only skins and almonds are obtained, but also an eventually high of fruits become peeled and remain mixed with the skins and almonds.

As this didn't happen with the native varieties, of a harder nature, the currently existing machines do not have mechanisms for separating the elements, since it was considered that the separation made by the peeling mechanism itself was sufficient to pass leaves, skins, etc. but not the shelled almond. The concern is that, since there is also now a considerable amount of shelled fruit, these grains leak along with the skins resulting in a loss of fruit that must be taken into account.

At present, as a solution to this problem, suction mechanisms added to the process are used to perform the suction of skins and leaves, thereby allowing the treating of any variety of almonds.

However, this is done by means of systems or sets of machines made up of a peeler that can be followed by a screening machine and a suction machine and configuring a very complex structure made up of large platforms since all these machines are arranged in a sequential manner with a high electricity consumption.

Another drawback to be added to these sets of machines is that since they are separated from each other and form independent units even though they work on the same processing line, it is very difficult to control the variables of the process, such as the suction speed and the intensity of the same, depending on the variety of the fruit, since being separated it is not possible to check in real time how a change affects the rest of variables in the process.

It is not known the existence in the state of the art of any machine integrating the peeling or shelling functions and simultaneously performing a screening of the obtained product and a suction of certain elements thereof in such a way that, above all with the new varieties of the fruit, the loss of product may be reduced as much as possible by treating the whole product all together.

SUMMARY OF THE INVENTION

The integrated machine for processing fruits with hard or soft shell, which comprises a feeding hopper and a processing mechanism suitable for peeling or dehulling the fruit as disclosed therein, comprises screening means arranged below the processing mechanism, with a first fruit entry end and a second opposite end, comprising at least one screening element to separate the product into two levels, and selection means by suction applied to at least one level of the screening means.

In this machine, the processing mechanism also has outlet means for the mixture obtained after processing the fruit, arranged in correspondence to the projection of the first entry end of the screening means.

With the integrated machine for processing fruits as here proposed, a significant improvement of the state of the art is obtained.

This is so because a machine is achieved that, by integrating the screening and suction processes, it is capable for an effectively separation of elements of the mixture resulting from the action of the peeling or dehulling mechanism, preventing the fruit grains from being separated along with the skins and shells.

With this, the product losses are significantly reduced, because due to the introduction of new varieties of fruits, in the case of almonds of a softer nature, their behavior has advantageously changed since previously a lot of fruit was being lost as grains leaked along with the skins and branches and leaves.

Thus, by introducing selection mechanism by suction, this machine is capable of working with any type of almonds or fruits with shell in general.

With this integrated configuration of the machine, an important simplification is achieved, since current machines are very complex, and require a large platform with many consecutive machines that take up a lot of space and generate a high electricity consumption.

On the other hand, with this integrated machine it is possible to carry out a complete control of the process, by varying the speed and intensity of the aspiration depending on the variety of the fruit, and these variations can be controlled as the whole machine forms an integrated set. In this way, it is possible to use the torque information of the peeler shaft or to monitor the inflow to the machine, to regulate the suction and achieve a fine adjustment with actuators or frequency variators.

It is therefore a very efficient machine, which achieves a significant reduction in the occupied space, costs and product losses, thereby increasing productivity.

BRIEF DESCRIPTION OF THE DRAWINGS

In order to help for a better understanding of the characteristics of the present invention, according to a preferred practical embodiment example thereof, a set of drawings are provided as an integral part of said description, where, with an illustrative and non-limiting nature, it is depicted the following.

DETAILED DESCRIPTION OF THE INVENTION

Figure 1:
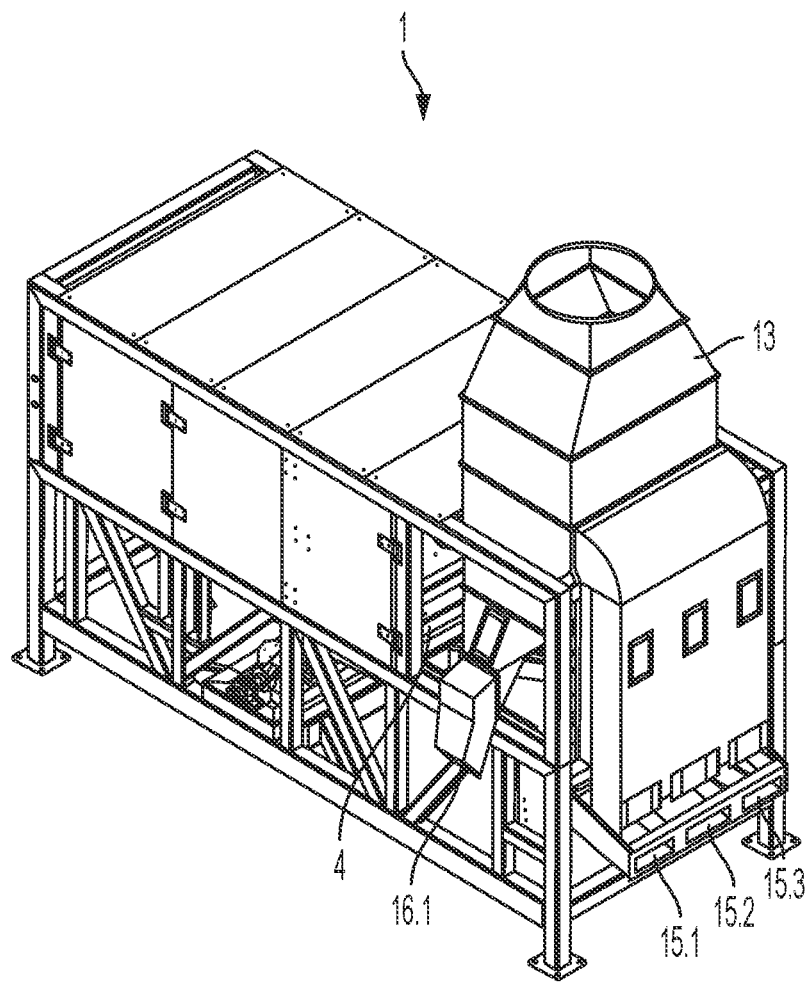
FIG. 1 shows a perspective view of an integrated machine for processing nuts with a hard or soft shell, according to a first preferred embodiment of the invention.

In view of the attached figures, it can be seen how in a preferred embodiment of the invention, the integrated machine (1) for processing nuts with a hard or soft shell, which comprises a feeding hopper (2) and a processing mechanism (3) suitable for peeling or dehulling the fruit as proposed herein, comprises screening means (4) arranged below the processing mechanism (3) with a first end (4.1) for entering the fruit and a second opposite end (4.2), and comprising at least one screening element to separate the product into two levels, and suction selection means applied to at least one of said levels of the screening means (4).

The processing mechanism (3) of the present machine (1) has outlet means for the mixture obtained after processing the fruit, arranged in correspondence with the projection of the first entry end (4.1) of the screening means (4).

Figure 2:
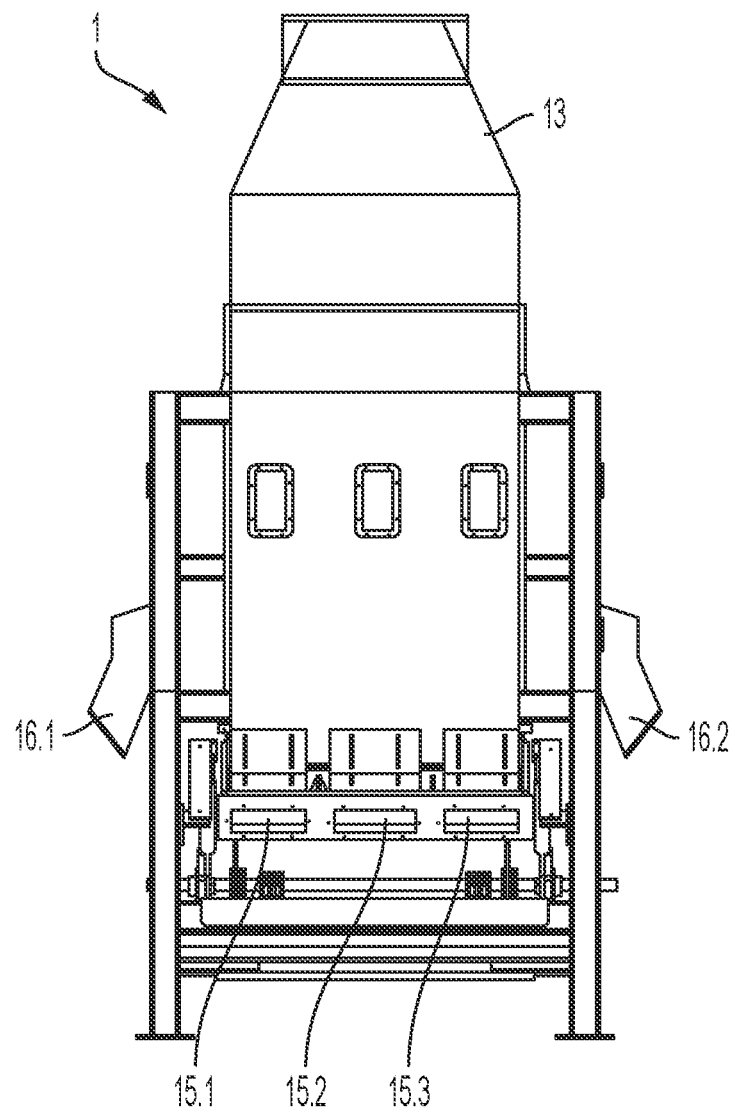
FIG. 2 shows a profile view of an integrated machine for processing nuts with a hard or soft shell, according to a first preferred embodiment of the invention.
Figure 3:
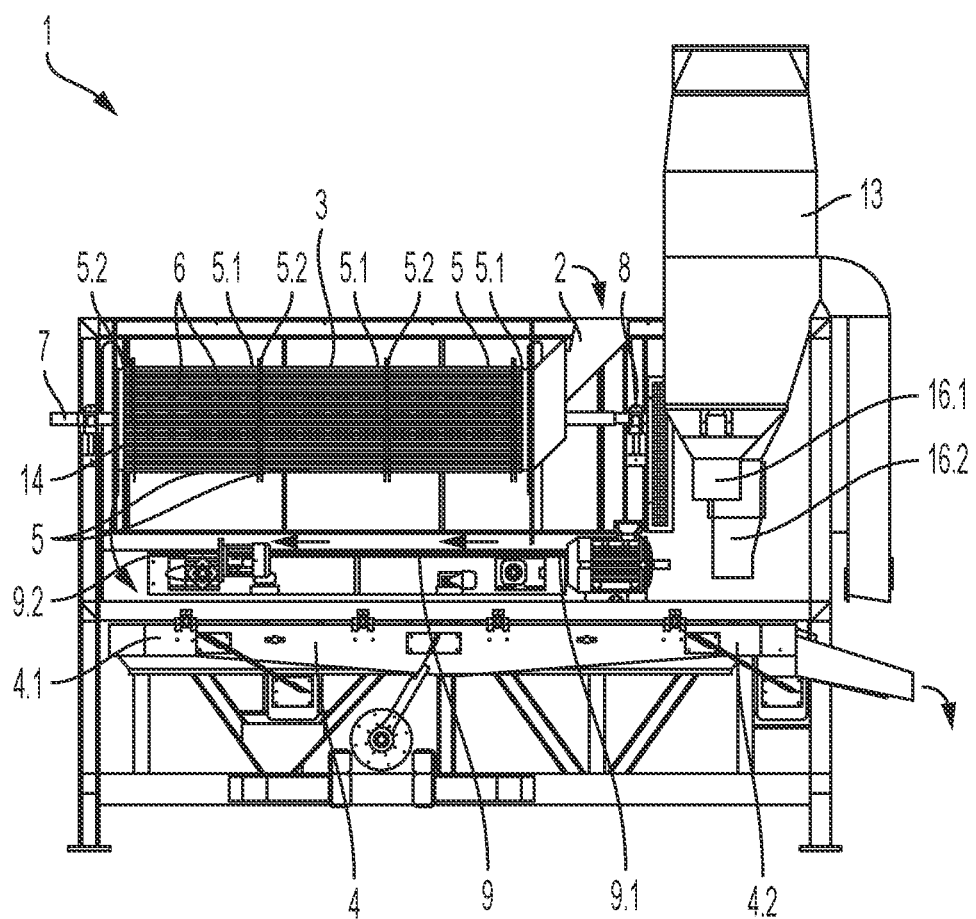
FIG. 3 shows a sectional view of an integrated machine for processing nuts with a hard or soft shell, according to a first preferred embodiment of the invention.

As shown in FIGS. 1 to 3, in a first preferred embodiment of the invention, the processing mechanism (3) is formed by at least one first cylindrical receptacle (5) arranged in a horizontal position. In this preferred embodiment of the present invention, as can be seen in FIG. 3, the processing mechanism (3) is formed by three receptacles (5) arranged in a consecutive manner.

Each receptacle (5) has a first end (5.1) for connection to the hopper (2), a second opposite end (5.2) and a lateral surface formed by a plurality of parallel and equidistant bars (6), and the processing mechanism comprises a central shaft (7) connected to a rotation motor (8) and arranged according to the longitudinal direction of said receptacles (5) through them.

This central shaft (7) comprises finger-like elements radially projecting outward from various longitudinal positions of said central shaft (7).

The outlet means (14) for the mixture are located at the second end (3.2) of the receptacle (5) located farthest from the feeding hopper (2) and, in this first embodiment, they are formed by an outlet opening at said second end (3.2) of the receptacle (5).

In this first embodiment it is considered that the processing mechanism (3) is a machine to peel the fruit and the screening means (4) have two screening elements which separate the product into three screening levels. In other embodiments, the processing mechanism (3) may be formed by a dehulling machine.

Furthermore, in this first embodiment, as can be seen in FIG. 3, this integrated machine (1) comprises means for collecting and transporting the elements of smaller size to the separation distance between the bars (6) of the receptacles (5). This occurs because the process here outlined is aimed to almonds of a soft nature, so unlike what occurs with harder almonds, when peeling the almonds, some of the fruits are shelled and loose almond grains are generated which can pass through the bars (6) of the receptacle (5) and to escape therebetween.

To collect these grains and to avoid them to fall uncontrollably into the screening means (4), said collecting and transporting means are installed, these consisting of a conveyor belt (9) in a direction parallel to the central shaft (7) of the receptacle (5) located there below, between said processing mechanism (3) and the screening means (4).

The conveyor belt (9) has a first and a second opposite ends (9.1, 9.2), where the second end (9.2) is arranged in correspondence to the projection of the first entry end (4.1) of the screening means (4). In this arrangement, the conveyor belt (9) is provided with a transporting movement towards said second end (9.2) thereof, so that the grains escaping between the bars (6) of the receptacle (5) are collected by the conveyor belt (9) and led to the second end (9.2) thereof from where they are dumped to the first level of the screening means (4) together with the fruits coming out from the processing mechanism (3) through the outlet means (14).

In other embodiments where this processing mechanism (3) is a dehulling machine, the central shaft (7) has a different, faster speed, thus obtaining dehulling and therefore a much larger amount of grain, so that a high percentage of the processed almond, around 90%, passes between the bars (6) of the receptacle (5) and only the hardest almond that has not been split reaches the second end (3.2) of the processing mechanism (3) and exits through the outlet means (14). In this case it is even more necessary the existence of means for collecting and transporting all these grains that come out between the bars (6) to lead them to the first end (4.1) of the screening means (4).

Figure 4:
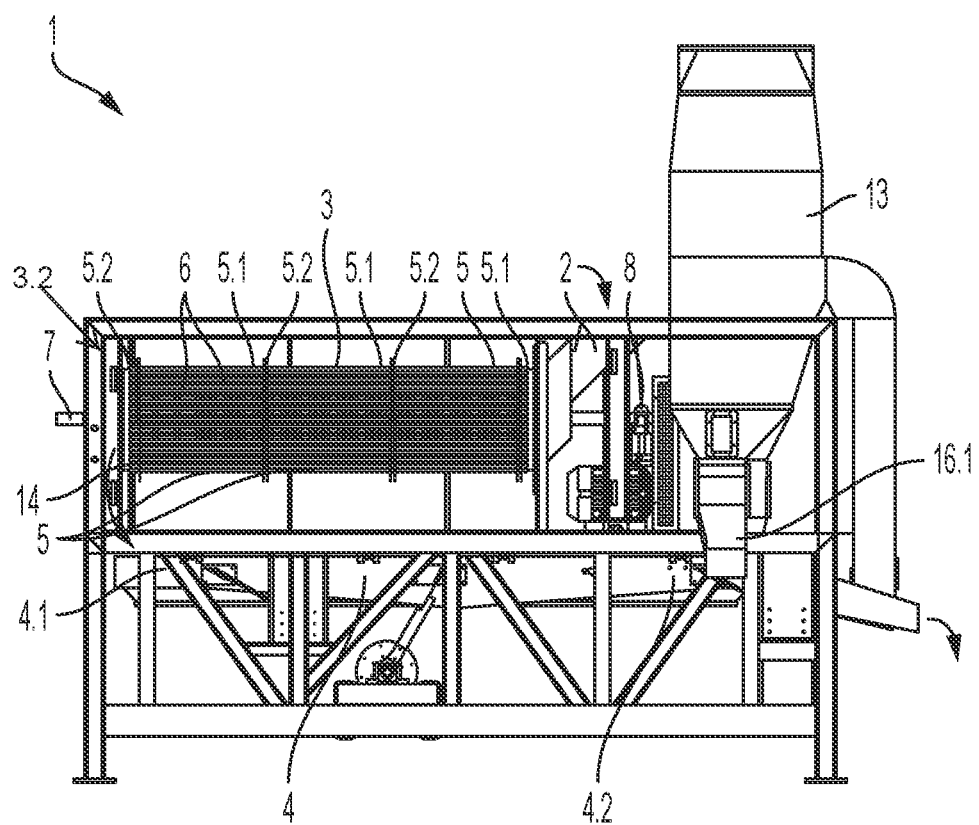
FIG. 4 shows an elevation view of an integrated machine for processing nuts with a hard or soft shell, according to a second preferred embodiment of the invention.

Likewise, in other embodiments, as it is the case of a second embodiment proposed in this specification and shown in FIG. 4, the processing mechanism (3) can consist of a peeling machine intended for peeling hard almonds, in which case the dehulling of the almonds does not occur, as this variety is hard almonds and therefore, the existence of means for collectimg and transporting the grains is not required, since not existing any dehulling operation, no grains of the fruit can pass between the bars of the receptacle.

In said FIG. 4, the processing machine (1) for this case has been illustrated, in which no conveyor belt (9) is included below the receptacle (5) between the processing mechanism (3) and the screening means (4).

According to another aspect, in the first preferred embodiment of the invention, the selection means (13) by suction are pneumatic means.

Likewise, in this first embodiment, the integrated machine (1) comprises means for controlling and monitoring the motor torque of the processing mechanism (3) and the selection means comprise means for regulating the aspiration intensity and speed, said means comprising frequency actuators or variators connected to said controlling and monitoring means.

In this way, it is possible to regulate the speed and the intensity at which the aspiration should be carried out, according to the information obtained from the monitoring, to obtain a precise aspiration and avoid an intensity excess or default.

Thus, in this first preferred embodiment of the invention, almonds are introduced through the feeding hopper (2) into the processing machine (1) and from there almonds pass to the processing mechanism (3), specifically to the cylindrical receptacles (5) of a peeling machine.

The almonds processed by this peeling machine leave the receptacle (5) through the outlet means (14) and together with the grains collected by the conveyor belt (9) of the collecting and transporting means are dumped to the first screening element of the screening means (4).

Said first screening element has a screen size such that the skins are retained on a first level and collected in a first outlet mouth (15.1). The rest, that is to say, the peeled almond and the grains of those almonds unintentionally dehulled as well as small twigs or pieces of skin with smaller size will pass to a second level of screening, on a second screening element.

In this first embodiment, on the first level where the skins are retained, there are no suction means, however in other embodiments it is possible to choose sucking at this level and either collecting the skins or sucking the peeled almonds that should remain stuck at this first level of screening.

The second screening element has a step size such that it allows the grains to pass to a third level while the peeled almonds are retained there along with residual waste formed by small twigs and remains of skins.

In this first embodiment, the second level has selection means (13) by suction of said waste, so that the peeled almond is collected free of the waste material exiting through a second outlet mouth (15.2), while the suctioned residual material is extracted through a first extraction mouth (16.1).

In the third level, the dehulled almond grain is collected and in this first embodiment, the use of selection means (13) by suction is also considered to separate the residual material that these grains present. Thus, the dehulled grain is collected in a third outlet mouth (15.3), while the sucked residual material is extracted by means of a second extraction mouth (16.2).

In other embodiments, the machine can have more screening levels to separate, for example, another size of peeled almonds, or even it can even have one less screening level, that is to say, a single screening element that separates the product into two unique levels so that, on the first level, the skins are collected and on the second level, the peeled almonds with impurities mixed with skins and shelled almond grains are collected. In this case, at least said second level must have suction means to separate the shelled almond grains from the rest of the peeled almonds and from the skins.

The first embodiment example has been proposed for a specific processing mechanism (3), however the present integrated processing machine (1) may have a different processing mechanism.

Thus, a third preferred embodiment of the present invention is proposed, in which the processing mechanism (3) is a shelling machine formed by a closed band (10) located below the feeding hopper (2) and arranged around a first and second rollers (11.1, 11.2) separated from each other that determine a first end (10.1) connected to the feeding hopper (2) and a second end (10.2) of the band (10) and, a third roller (12) located above the band (10) at a distance from said band such that a space for the fruits to pass through is defined between them.

At the second end (10.2) of the band (10) the outlet means (14) for the dehulled product are located.

Furthermore, in the present case the first roller (11.1) of said band (10) is machined with means of rotation around its central axis such that the upper part of said band has a movement from the first end (10.1) towards the second end (10.2) thereof.

Meanwhile, the third roller (12) is connected to a motor the rotating movement of which is in the opposite direction to that of the first roller (11.1) of the band (10).

In this third preferred embodiment, the third roller (12) includes means for regulating the distance separating said third roller from the band (10), so that it is possible to set the passage space for the fruits in accordance to the size thereof in each case.

Figure 5:
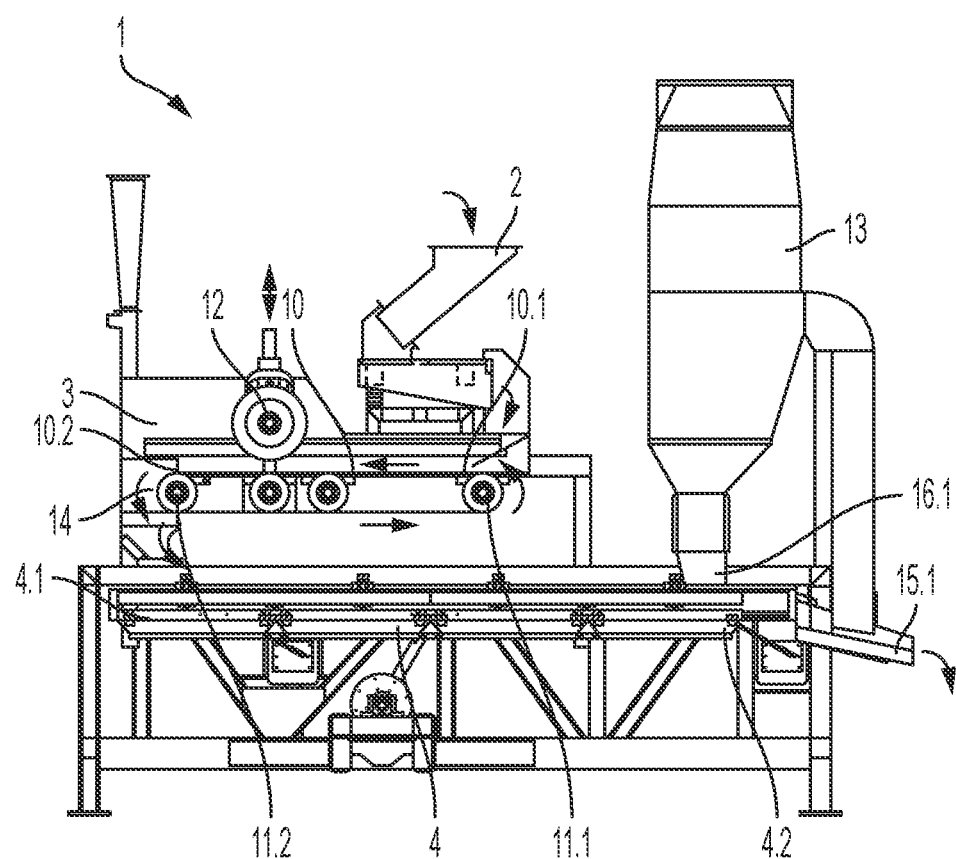
FIG. 5 shows a sectional view of an integrated machine for processing nuts with a hard or soft shell, according to a third preferred embodiment of the invention.

As shown in FIG. 5, in this third embodiment, the band (10) has a horizontal position and both the band (10) and the outer surface of the third roller (12) are made in an elastomeric material.

As already mentioned, in this third embodiment, the processing mechanism (3) is formed by a dehuller machine. In other embodiments, said processing mechanism comprises means for varying the function thereof between splitting and dehulling functions.

On the other hand, the screening means (4) of this third preferred embodiment of the present invention consist of a single screening element that therefore determines only two levels.

Since in this third embodiment the processing mechanism (3) is in charge of the shelling function, the almonds arriving there are already peeled and said mechanism is in charge of splitting them. In this case, what obtained is almond shells, the grain of the shelled almonds and some almonds that are not split. All of this reaches the first level.

At the first level, there is the screening element that retains the almonds that have not been split and the larger shells of the almonds that have been split. At this first level, the machine (1) comprises selection means (13) which use suction to remove said shells, which are extracted through a first extraction mouth (16.1), while the non-split almonds are collected through a first outlet mouth (15.1), to be then reintroduced into the process.

The grains of the split almonds and smaller shells pass to the second level. In this second embodiment, the machine (1) includes selection means (13) by suction on this second level, to suck the grains of the split almonds and thus separate them from the remains of the shells. The sucked grains exit through a second extraction mouth (not shown in Figures), while the remains of the shells are collected by a second exit mouth (not shown in the Figures).

In other embodiments, it is possible to have more levels of screening, so that split almonds and skins are separated on each lower level, all them smaller than on the upper level.

The described embodiments are only examples of the present invention, therefore, the specific details, terms and phrases used herein are not to be construed as limiting, but are to be understood only as a basis for the claims and as a representative basis that provides an understandable description as well as sufficient information to the person skilled in the art to apply the present invention.

What is claimed is:

1. An integrated machine for processing nuts with hard or soft shells, which comprises:
   a feeding hopper and a processing mechanism for peeling or dehulling or peeling and dehulling the nuts to produce a mixture which is screened by the machine:
   a screening device arranged below the processing mechanism, with a first end for introducing the mixture and a second opposite end, the screening device comprising at least one screen element to separate the mixture on two levels;
   where the processing mechanism has an outlet for a mixture obtained after processing the nuts, arranged in correspondence with a projection of a first inlet end of the screener, and
   a suction selection device which applies suction to at least one level of the screening device;
   wherein the processing mechanism is formed by a closed belt located lower than the feeding hopper and arranged around a first roller and a second roller separated from each other both determining a first end of the closed belt connected to the feeding hopper and a second end of said belt provided with the outlet for the mixture obtained after processing the nuts, and where the first roller or the second roller is provided with roller mechanisms to rotate around its central axis such that an upper part of the closed belt has a movement from the first end towards the second end and, a third roller connected to a motor rotating, in use, in an opposite direction to that of the first and second rollers and located above said closed belt at a distance from said closed belt such that between the first roller or the second roller provided with a roller mechanism and said closed belt is a space for nuts to pass through, so that said nuts are peeled, dehulled or peeled and dehulled.

2. The integrated machine for processing nuts with hard or soft shells according to claim 1, wherein the third roller has a regulator which varies a separation distance of the third roller to the closed belt.

3. The integrated machine for processing nuts with hard or soft shells according to claim 1, wherein the closed belt is in a horizontal position.

4. The integrated machine for processing nuts with hard or soft shells according to claim 1, wherein the closed belt and/or an outer surface of the third roller is made of an elastomeric material.

5. The integrated machine for processing nuts with hard or soft shells according to claim 1, wherein the processing mechanism is formed by at least one first cylindrical receptacle arranged in a horizontal position in such a way that it presents a first end for connection to the feeding hopper, a second opposite end and a lateral surface formed by a plurality of parallel and equidistant bars, and a central shaft connected to a rotating motor and arranged along the longitudinal axis of the at least one first cylindrical receptacle therethrough, with finger-like elements radially projecting outward from various longitudinal positions of said central shaft, wherein an outlet is located at the second end of the receptacle located farthest from the feeding hopper.

6. The integrated machine for processing nuts with hard or soft shells according to claim 5, further comprising a collector which collects and transports parts of the nuts smaller than a separation distance between the bars of the receptacle wherein the collector comprises a conveyor belt in a direction parallel to the central shaft of the receptacle and located below said receptacle, between said processing mechanism and the screener, and which presents a first end and a second opposite end arranged in correspondence with the projection of the first inlet end to entry in the screener, wherein the conveyor belt has a transport movement towards the second opposite end of the collector.

7. The integrated machine for processing nuts with hard or soft shells according to claim 1 wherein the selector applies pneumatic suction.

8. The integrated machine for processing nuts with hard or soft shells according to claim 1, further comprises a controller which controls and monitors driving torque of the processing mechanism, and the selector includes a regulator which regulates suction intensity and suction speed, comprising actuators or frequency variators connected to said controller.

9. The integrated machine for processing nuts with hard or soft shells according to claim 1 wherein the processing mechanism is a peeling machine.

10. The integrated machine for processing nuts with hard or soft shells according to claim 1, wherein the processing mechanism is a dehulling machine.

11. The integrated machine for processing nuts with hard or soft shells according to claim 1, wherein the processing mechanism is configured to be set to process nuts by selecting a splitting mode of action or a dehulling mode of action.

\* \* \* \* \*